US011007651B2

United States Patent
Linnell et al.

(10) Patent No.: US 11,007,651 B2
(45) Date of Patent: *May 18, 2021

(54) HAPTIC CONTROLLER WITH TOUCH-SENSITIVE CONTROL KNOB

(71) Applicant: Verily Life Sciences LLC, Mountain View, CA (US)

(72) Inventors: Jeffrey Linnell, San Francisco, CA (US); Anthony Sean Jules, Oakland, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 15/842,883

(22) Filed: Dec. 15, 2017

(65) Prior Publication Data

US 2018/0111273 A1     Apr. 26, 2018

Related U.S. Application Data

(63) Continuation of application No. 14/746,076, filed on Jun. 22, 2015, now Pat. No. 9,862,099.

(51) Int. Cl.
*B25J 13/02*     (2006.01)
*G06F 3/01*     (2006.01)
(Continued)

(52) U.S. Cl.
CPC .......... *B25J 13/025* (2013.01); *B25J 13/081* (2013.01); *B25J 13/084* (2013.01); *G06F 3/016* (2013.01);
(Continued)

(58) Field of Classification Search
CPC . B25J 13/00; B25J 13/02; B25J 12/025; B25J 13/065; B25J 13/081; B25J 13/082;
(Continued)

(56) References Cited

U.S. PATENT DOCUMENTS 5,004,391 A * 4/1991 Burdea ...................... B25J 3/04
                                                                  294/200
5,587,937 A    12/1996 Massie et al.
(Continued)

FOREIGN PATENT DOCUMENTS

JP         2005068935         3/2005

OTHER PUBLICATIONS

Badescu et al., "Rotary Haptic Knob for Vehicular Instrument Controls," Proceedings of the 10th Sypm. on Haptic Interfaces for Virtual Envir. & Teleoperator Systs. (Haptics'02), IEEE, 2002, 2 pages.
(Continued)

*Primary Examiner* — Nicholas Kiswanto
(74) *Attorney, Agent, or Firm* — Christensen O'Connor Johnson Kindness PLLC

(57) ABSTRACT

Example implementations may relate to a haptic handholdable controller. In particular, an example device may take the form of a haptic controller, which senses tactile information and provides force feedback for a more intuitive user experience. The force feedback may indicate a state of the device that is being controlled. An example haptic handheld controller may be utilized to manipulate data input to a robot, a tablet computer, and/or any other type of computing device. In an example embodiment, the haptic handheld controller may be such that the controller indicates to the user what manipulation of different types of data feels like, for example, by using operating modes for the haptic handheld controller where a motor varies feedback to the handheld controller.

20 Claims, 11 Drawing Sheets

(51) Int. Cl.
  *G06F 3/041* (2006.01)
  *G06F 3/0362* (2013.01)
  *B25J 13/08* (2006.01)
  *B25J 13/06* (2006.01)

(52) U.S. Cl.
  CPC ............ *G06F 3/0362* (2013.01); *G06F 3/041* (2013.01); *B25J 13/065* (2013.01); *G05B 2219/35438* (2013.01); *G05B 2219/35449* (2013.01); *G06F 2203/04104* (2013.01)

(58) Field of Classification Search
  CPC ......... B25J 13/084; G05B 2219/35438; G05B 2219/35449; G06F 3/041; G06F 3/0362; G06F 3/016; G06F 2203/04104
  See application file for complete search history.

(56) References Cited

U.S. PATENT DOCUMENTS

| | | | |
|---|---|---|---|
| 6,833,846 B2 | 12/2004 | Hasser | |
| 7,010,369 B2 | 3/2006 | Borders et al. | |
| 7,298,385 B2 | 11/2007 | Kazi et al. | |
| 8,531,392 B2 * | 9/2013 | Branton | G06F 3/0485 345/156 |
| 8,639,386 B2 | 1/2014 | Summer et al. | |
| 8,823,645 B2 * | 9/2014 | Kryze | G06F 3/041 345/158 |
| 9,069,396 B2 * | 6/2015 | Adler | G06F 3/0346 |
| 9,120,381 B2 * | 9/2015 | Genesin | G06F 3/0338 |
| 9,393,699 B1 | 7/2016 | Jules et al. | |
| 9,619,053 B2 * | 4/2017 | Lee | G06F 3/0482 |
| 10,328,344 B2 * | 6/2019 | Bellinghausen | A63F 13/2145 |
| 2002/0036622 A1 * | 3/2002 | Jaeger | G06F 3/03545 345/173 |
| 2004/0257339 A1 * | 12/2004 | Takahashi | G06F 3/0338 345/156 |
| 2006/0092129 A1 * | 5/2006 | Choquet | G05G 1/105 345/156 |
| 2007/0057922 A1 * | 3/2007 | Schultz | G06F 3/03547 345/173 |
| 2007/0236450 A1 * | 10/2007 | Colgate | G06F 3/0428 345/156 |
| 2009/0009491 A1 * | 1/2009 | Grivna | G06F 3/033 345/184 |
| 2012/0095619 A1 | 4/2012 | Pack et al. | |
| 2014/0214239 A1 | 7/2014 | Bruck et al. | |
| 2016/0089212 A1 * | 3/2016 | Balicki | A61B 34/25 606/130 |
| 2017/0139481 A1 * | 5/2017 | Long | G06F 3/0338 |

OTHER PUBLICATIONS

Launch of Kickstarter Campaign, https://www.kickstarter.com/projects/spinremote/spin-remote-the-simplest-most-personal-remote-ever/descripton, Dec. 2014.

Kickstarter, "SPIN remote—The Simplest, most Stylish remote ever", Dec. 2, 2014, <https://www.kickstarter.com/projects/spinremotelspin-remote-the-simplest-most-personal-remote-ever>.

* cited by examiner

HAPTIC CONTROLLER WITH TOUCH-SENSITIVE CONTROL KNOB

RELATED APPLICATION

This application is a continuation of U.S. patent application Ser. No. 14/746,076, filed Jun. 22, 2015, now U.S. Pat. No. 9,862,099, the contents of which are incorporated by reference herein for all purposes.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to a computing device that receives output data from a handheld controller including a knob and tactile sensors coupled to the knob. Based on the output data, the computing device may distinguish between two or more grips on the knob of the handheld controller and generate commands for control of a robotic device.

In one aspect, a handheld controller is provided. The handheld controller, configured to operate a robotic system, includes a rotatable knob. The handheld controller also includes at least one motor that is operable to apply torque to the rotatable knob. The handheld controller includes one or more touch sensors arranged on a curved surface of the rotatable knob to sense touch data. The handheld controller also includes a control system that is configured to detect touch data received from the one or more touch sensors, receive operating mode data indicating an operating mode for the rotatable knob, operate the at least one motor to apply torque to the rotatable knob in accordance with the operating mode data, detect rotation of the knob, and provide, to a controller application, output data indicative of the detected touch data and the detected rotation of the knob, wherein the output data is used to generate commands for control of a robotic device.

In one aspect, a handheld controller is provided. The handheld controller includes a rotatable knob. The handheld controller also includes at least one motor that is operable to apply torque to the rotatable knob. The handheld controller includes one or more tactile sensors arranged on a curved surface of the rotatable knob to sense touch data. The handheld controller also includes a control system that is configured to detect touch data received from the one or more touch sensors, select an active grip, based on the detected touch data from a list of anticipated grips, detect rotation of the knob, and provide, to a controller application, output data indicative of the detected touch data and the detected rotation of the knob, wherein the output data is used to generate commands for control of a robotic device.

In one aspect, a method is provided. The method includes detecting, by a handheld controller, touch data from one or more touch sensors where the handheld controller includes a control knob, where the control knob includes one or more touch sensors, and where the touch sensors are arranged to generate touch data that provides a basis for distinguishing between two or more grips on the control knob. The method includes receiving, by a handheld controller, operating data for the control knob, where the operating data indicates one or more operating modes for the control knob. The method includes operating the at least one motor to affect the rotation of the control knob in accordance with at least one of the one or more operating modes. The method includes detecting a rotation of the control knob and generating, by the handheld controller, output data indicative of the detected touch data and the detected rotation of the knob, wherein the output data is used to generate commands for control of a device.

These as well as other aspects, advantages, and alternatives will become apparent to those of ordinary skill in the art by reading the following detailed description, with reference where appropriate to the accompanying drawings.

DETAILED DESCRIPTION

Figure 1A:
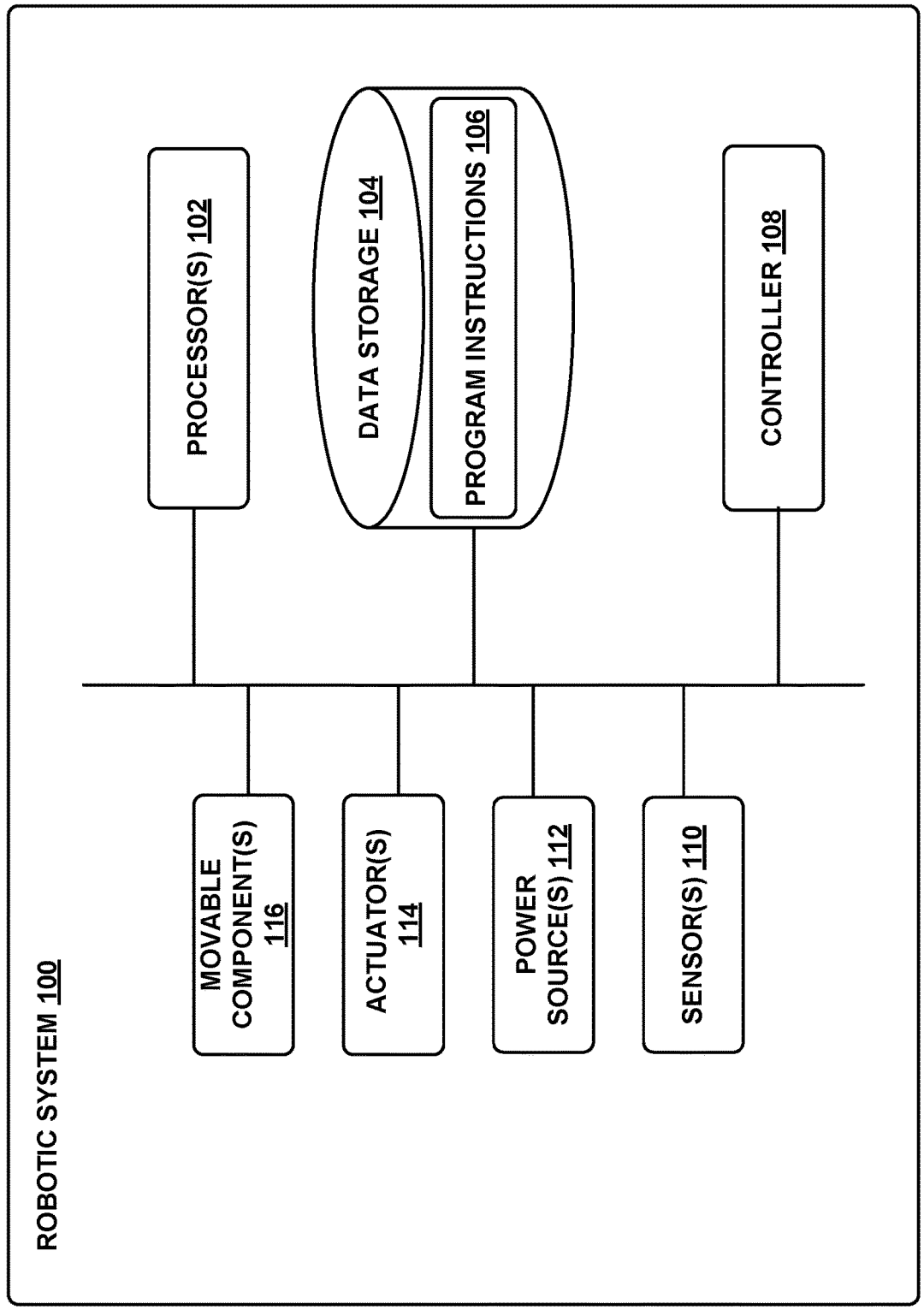
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are methods and systems for a handheld controller. An example handheld controller may be utilized to manipulate data input to a computing device. Further, an example device may take the form of a haptic handheld controller, which senses tactile information (e.g., touch, proximity, pressure) and provides force feedback indicting information, such as the state of the device that is being controlled.

In an example embodiment, a haptic controller includes a motorized knob that applies torque to the knob, and thus can provide force feedback, can rotate the knob autonomously, and can apply torque to the amount of force a user must apply to rotate the knob. Configured as such, an example controller may vary the torque that is applied to the knob so as to simulate what manipulation of different types of data "feels" like. Further, the haptic controller can include touch sensors coupled to or integrated in the rotatable knob. For instance, in an example configuration the full surface (e.g., the full cylindrical or conical surface) of the knob may be a touch-sensitive surface. As such, rotation of knob and touch data received from the touch sensors may collectively generate handheld controller output data (i.e., computing device input data) that represents intended control actions provided by a user holding the handheld controller.

A computing device, such as a tablet, may receive input data from the handheld controller and may interpret the input data to determine specific intended operations of a robotic system. Upon processing the input data to determine a particular interpretation, the computing device may send commands to the robotic system in order to cause the robotic system to carry out intended operations of various components such as actuators coupled to joints, end effectors, appendages, speakers, and/or light sources, among others.

Moreover, in an example embodiment, touch sensors on the handheld controller may be arranged such that touch data generated by the touch sensors provides a basis for distinguishing between grips, gestures, and/or detected surface locations on the handheld controller. The user may use the controller to control the component via rotation the knob (possibly varying the resulting functionality based on the particular type of grip on the knob), and/or via touch gestures on one or more surfaces of the knob, among other possibilities. The computing device may receive input data that represents the user's interactions with the handheld controller and may interpret the input data to provide for intended control of the intended component. Given this design of the handheld controller as well as the capability of the computing device to provide extensive resources for operation of the robotic system based on data received from the handheld controller, the arrangements disclosed herein provide for a simple and intuitive control of various components of the robotic system.

II. ILLUSTRATIVE SYSTEMS

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
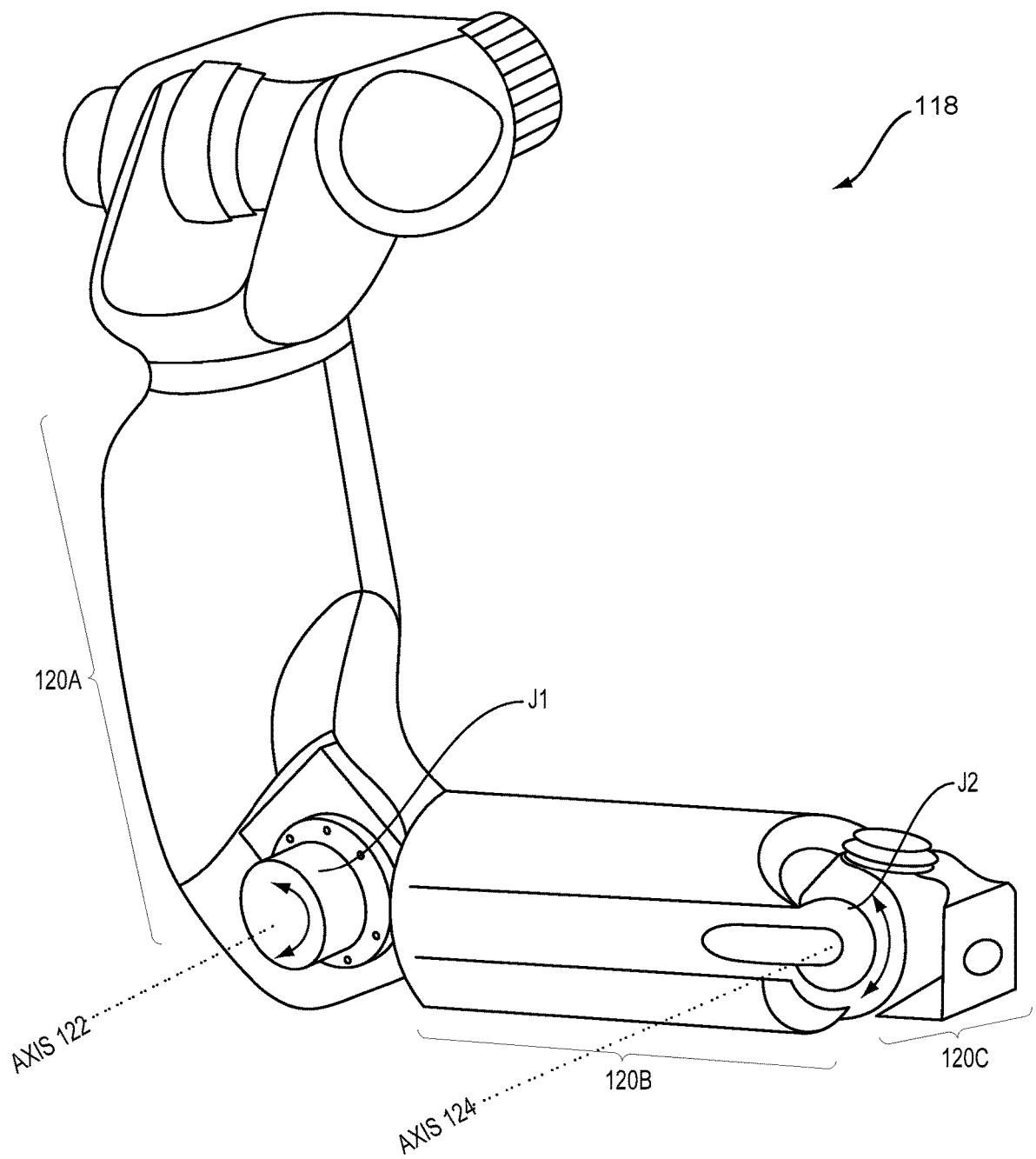

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
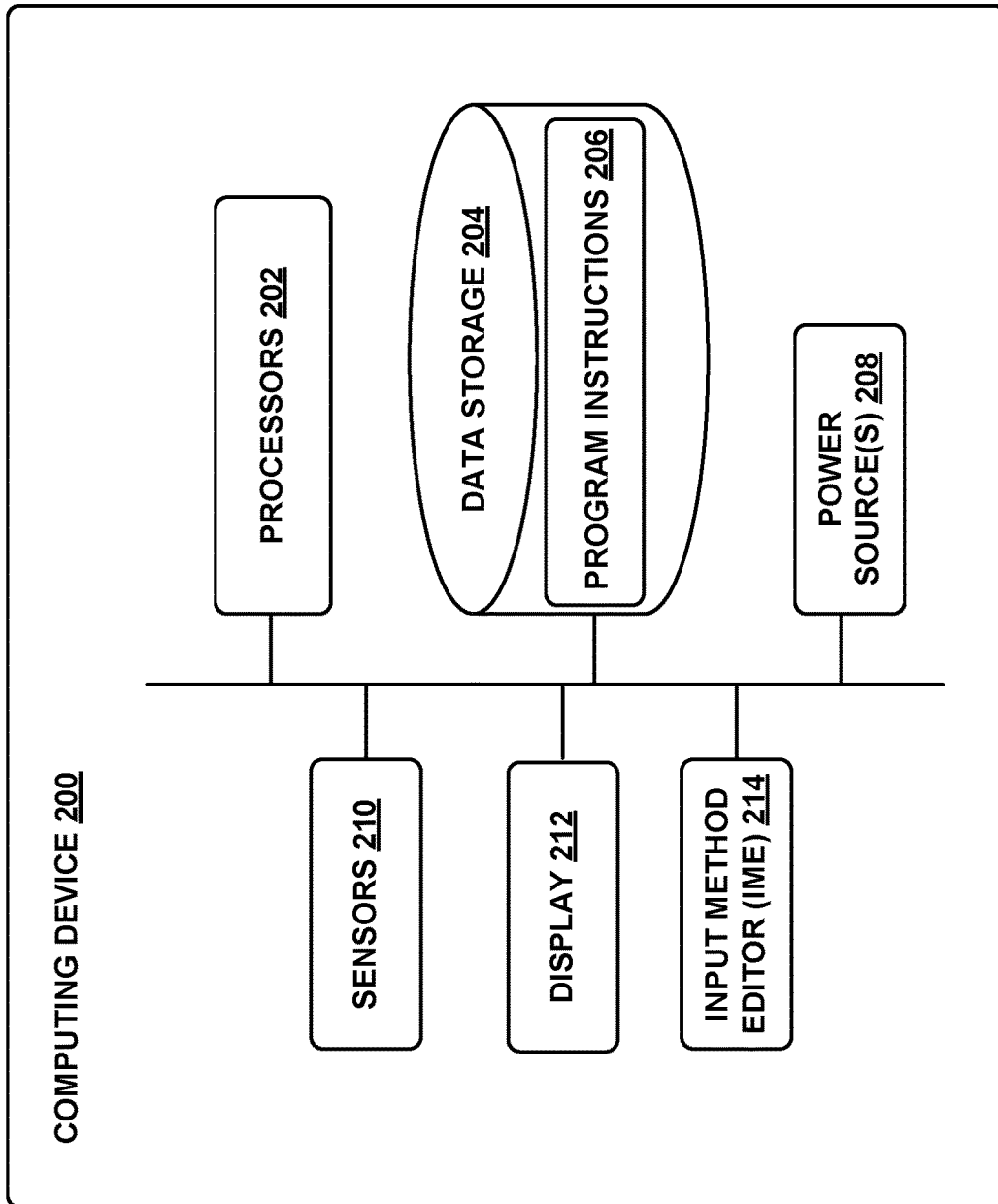
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
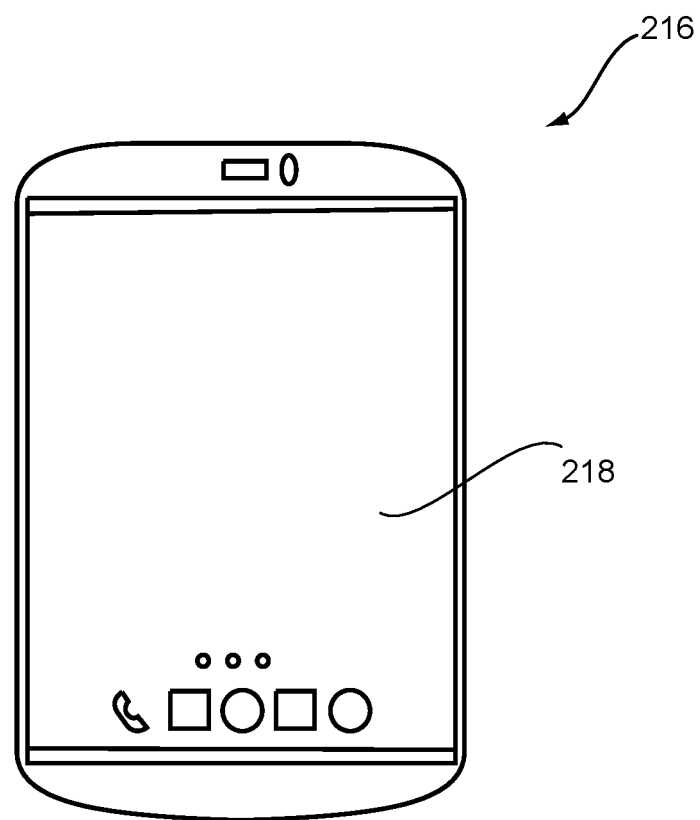

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
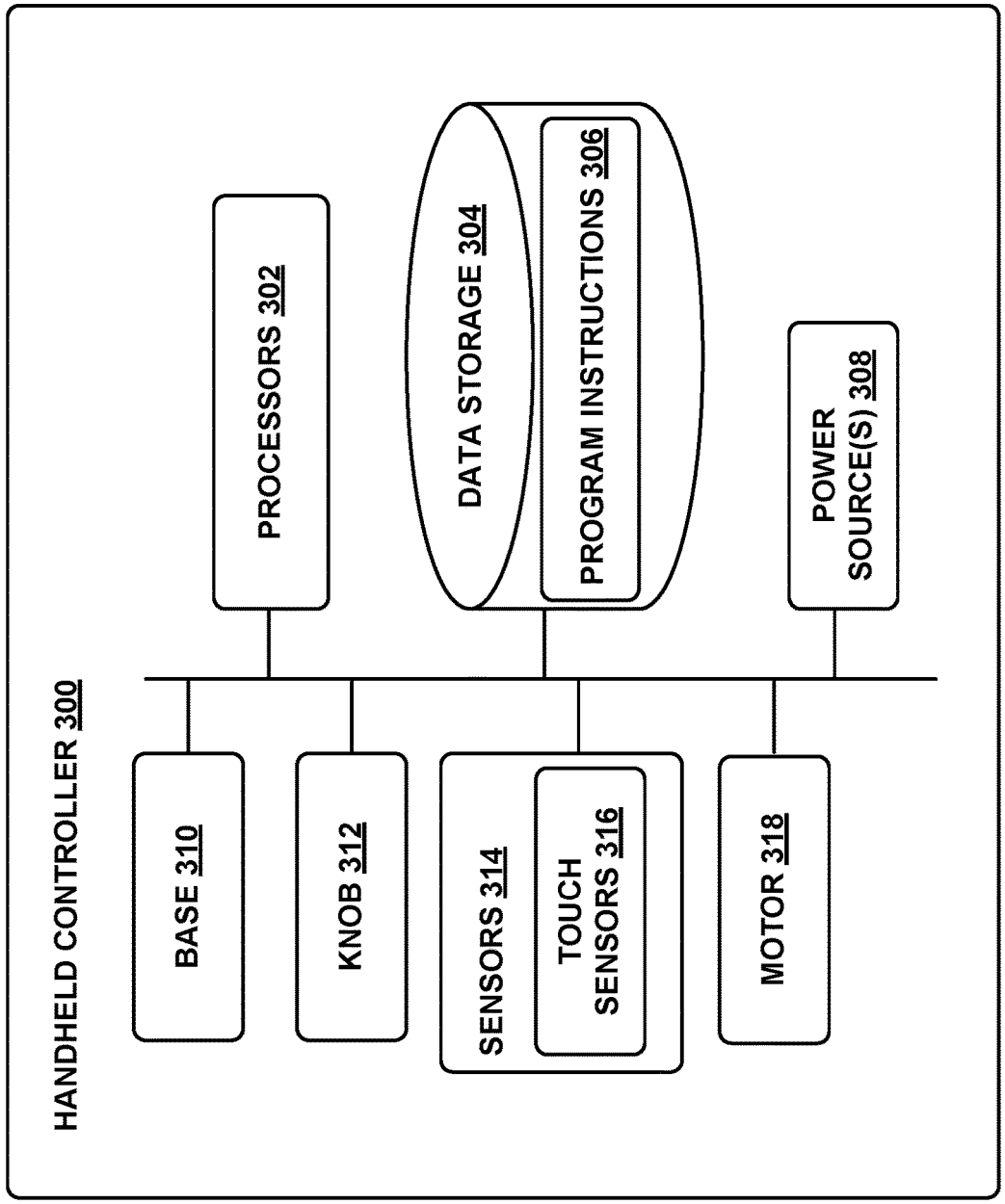
FIGS. 3A, 3B, 3C, and 3D illustrate an example handheld controller, according to an example implementation.
Figure 3B:
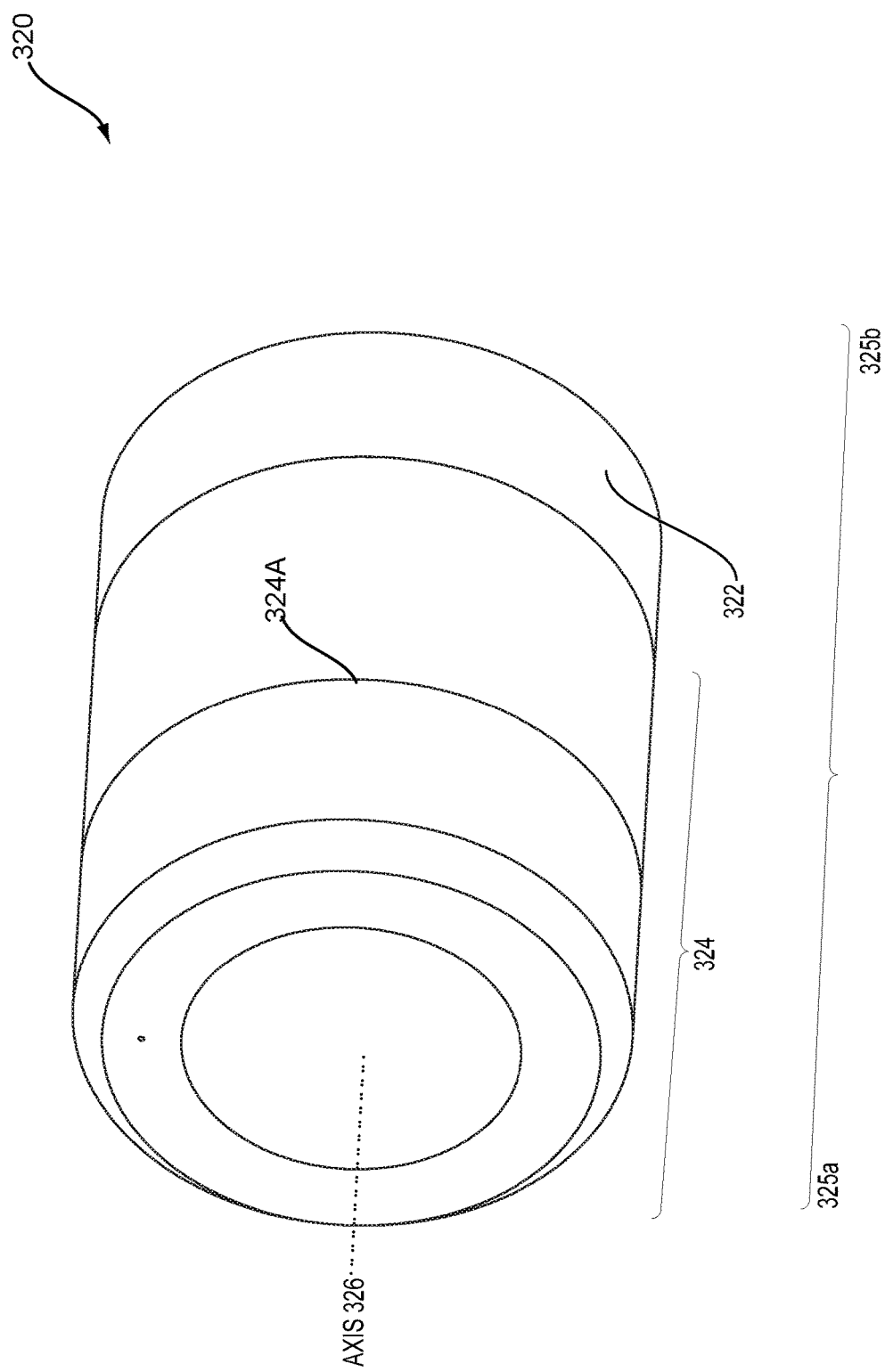

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of a component of a robotic system, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, analog touch sensors, resistive touch sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300. In some implementations, one or more resistive touch sensors may be arranged on a surface of the hand-holdable controller 300, such as a curved surface of the rotatable knob. The resistive touch sensors may used to sense a force (e.g., in Newtons per meter) on one or more surfaces of the hand-holdable controller. For example, the amount of force a user is exerting on one or more surfaces of the hand-holdable controller as sensed by the resistive touch sensor (e.g., the gripper component closes in relation to how hard the user presses down on the touch sensor) may correspond to the output of a gripper component on a robotic system. This resistive touch sensor may be advantageous to a robotic system, e.g., to determine how to affect an object (e.g., different forces on the knob as sensed by the resistive touch sensor may be used by the robotic system to tell a gripper component how to grip a plastic cup instead of an aluminum can or a glass bottle).

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply a torque-generating force to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
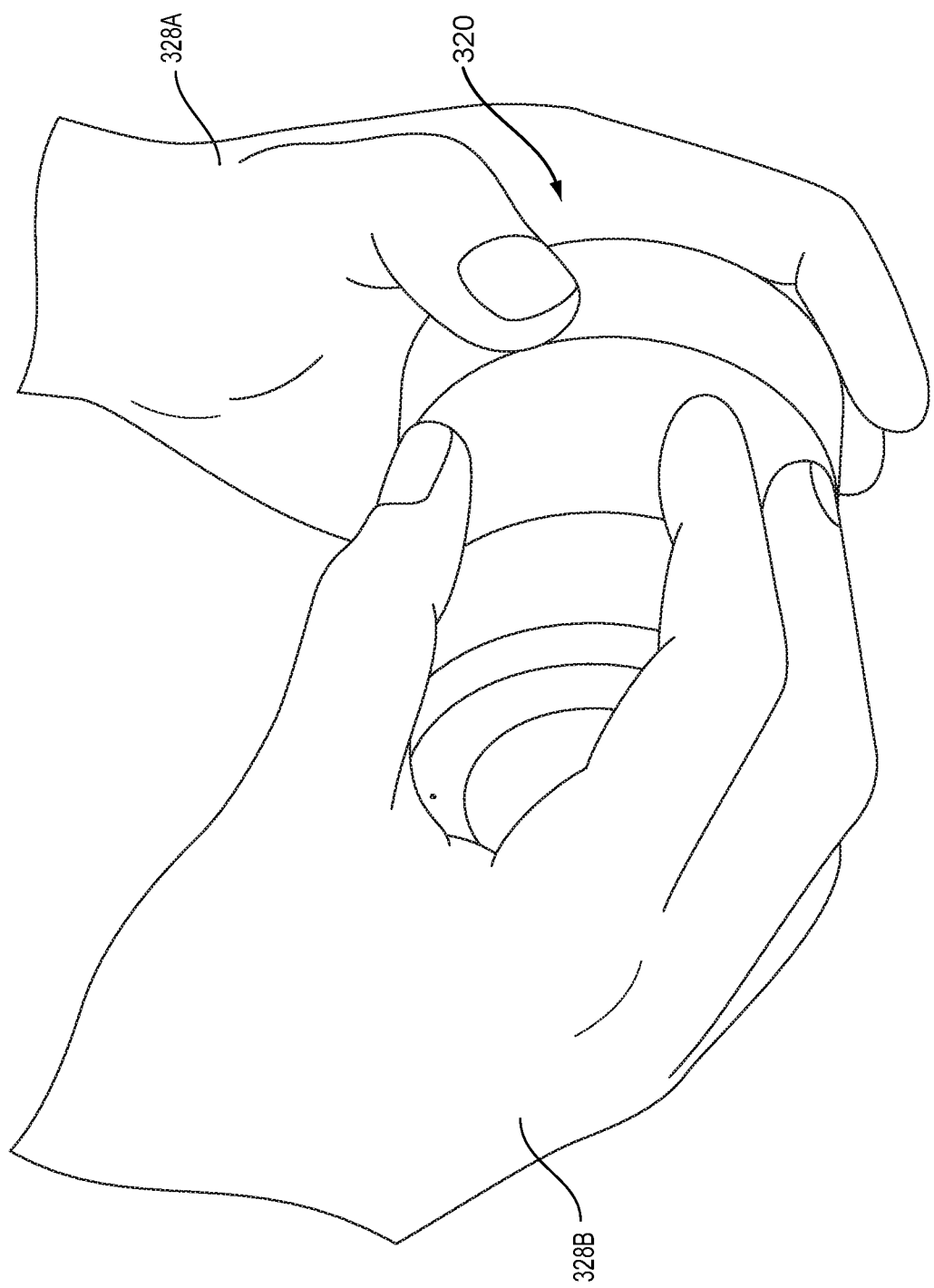

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

Figure 3D:
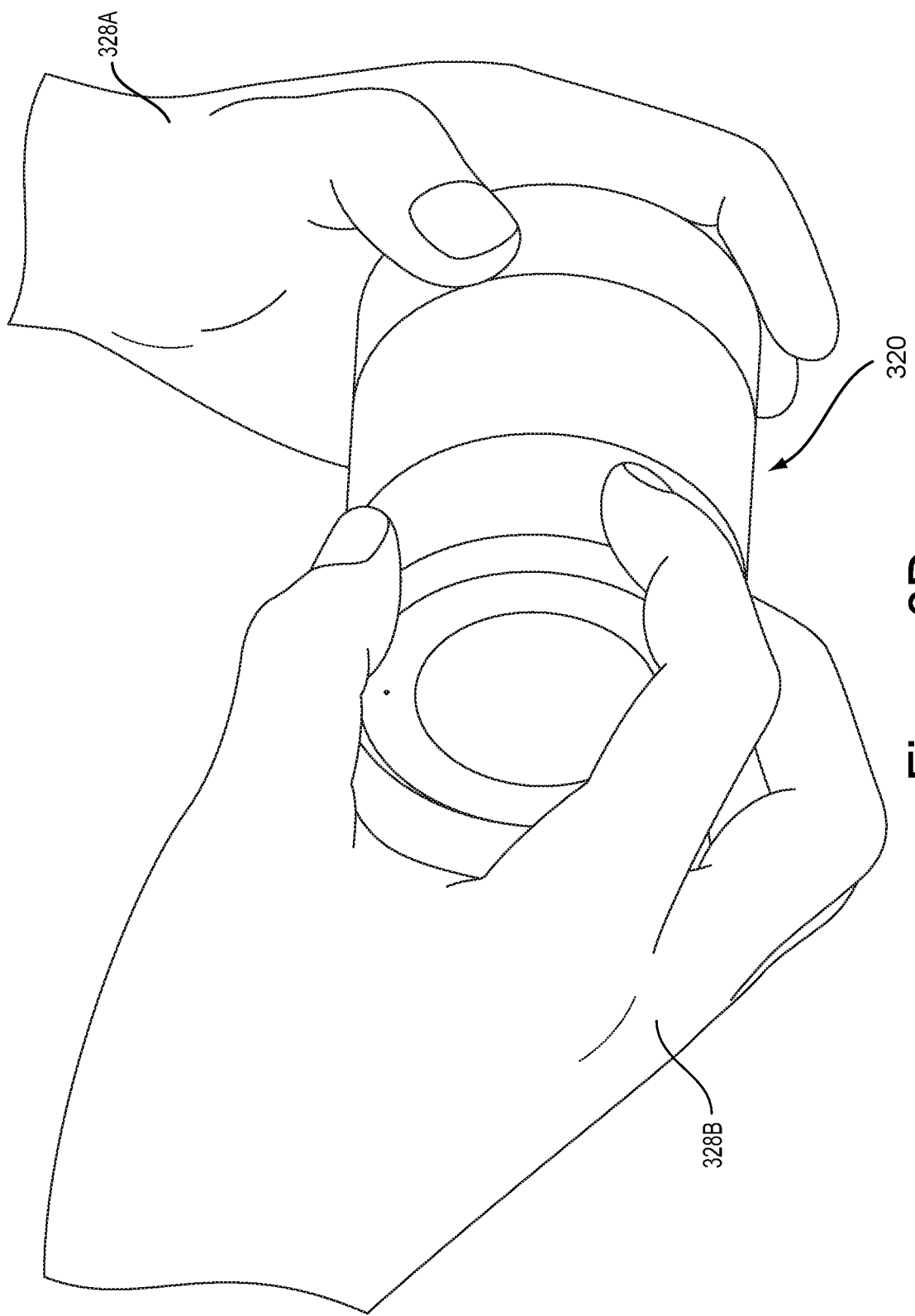

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip. (although applicable to other grips as well), touch input related to a finger retraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, detents) could be provided by the controller 300 in response to transitions between such touch inputs.

Figure 4:
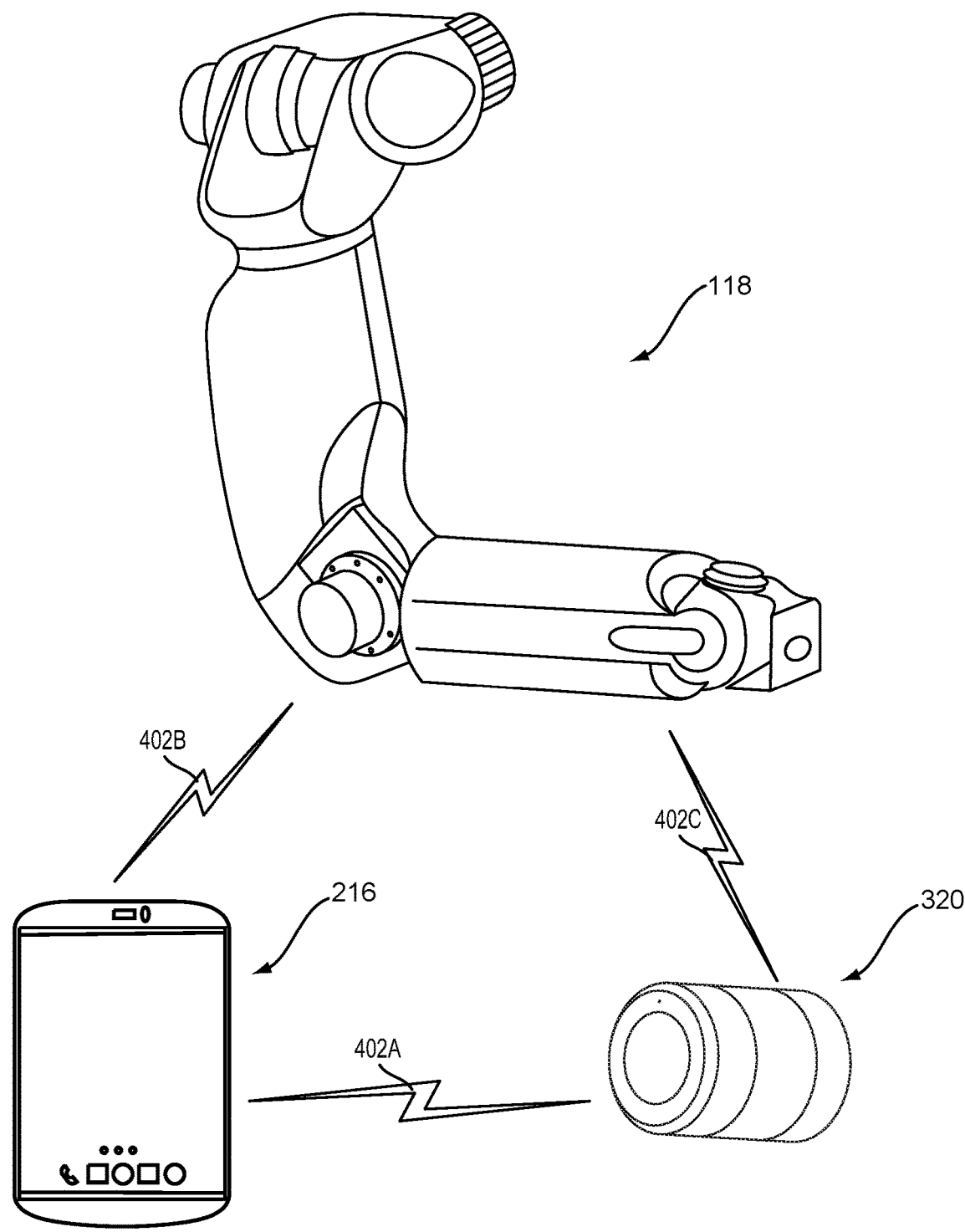
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some embodiments, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementations, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the rotor of the motor is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

Although reference is made throughout to a hand-holdable controller, this disclosure is not limited to hand-holdable controllers. For example, the controller 300 could attach to a vertical or horizontal surface (e.g., via a mechanical and/or magnetic attachment system) such as a wall, a support beam, a desk, or any other surface. In another example, the controller 300 could attach directly to a device (or portion of a device) it is controlling, such as a speaker, a robot arm, a lighting system, or another controllable device.

III. ILLUSTRATIVE METHODS

Figure 5:
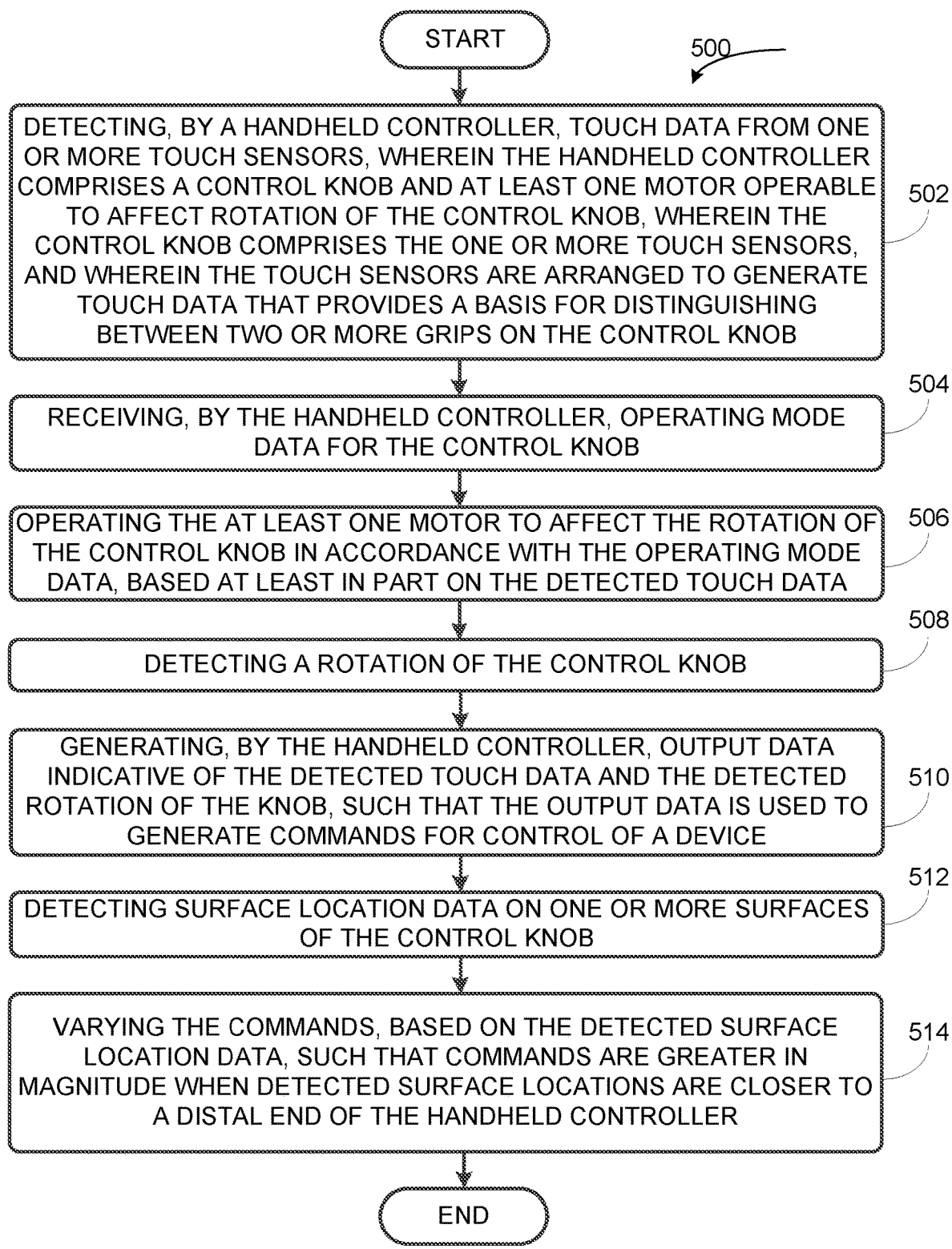
FIG. 5 is an example flowchart for a haptic handheld controller, according to an example implementation.

FIG. 5 is a flowchart illustrating a method 500, according to an example implementation. In particular, method 500 may be implemented to sense tactile information of a handheld controller and provide force feedback, such as the state of the device that is being controlled, to indicate to the user what manipulation of different types of data feels like.

Method 500 shown in FIG. 5 (and other processes and methods disclosed herein) presents a method that can be implemented within an arrangement involving, for example, the robotic system 100, the robotic arm 118, the computing device 200, tablet 216, handheld controller 300, example handheld controller 320 and/or within the arrangement 400 shown in FIG. 4 (or more particularly by one or more components or subsystems thereof, such as by a processor and a non-transitory computer-readable medium having instructions that are executable to cause the device to perform functions described herein). Additionally or alternatively, method 500 may be implemented within any other arrangements and systems.

Method 500 and other processes and methods disclosed herein may include one or more operations, functions, or actions as illustrated by one or more of blocks 502-516. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

At block 502, method 500 involves detecting, by a handheld controller (e.g., handheld controller 300), touch data from one or more touch sensors (e.g., touch sensors 316), where the handheld controller comprises a control knob (e.g., knob 312) and at least one motor (e.g., motor 318) operable to affect rotation of the control knob, where the control knob comprises the one or more touch sensors, and where the touch sensors are arranged to generate touch data that provides a basis for distinguishing between two or more grips on the control knob.

In an example implementation, input data may be received by computing device 200 (or robotic system 100) from handheld controller 300 (e.g., via communication links 402A or 402C). The input data may represent rotation of the knob 312 and/or touch data received via touch sensors 316 of the handheld controller 300. Moreover, this input data may affect one or more aspects of the computing device 200 as further discussed below. Additionally or alternatively, the computing device 200 may process and interpret this input data into one or more operations that should be carried out by one or more components of the robotic system 100. The computing device 200 may then send commands to the robotic system 100 (e.g., via communication link 402B) and the robotic system 100 may carry out these operations based on the received commands.

Various implementations may generally be discussed below in the context of the handheld controller 300 providing functionality of the robotic system 100 by way of the computing device 200 interpreting input data received from the handheld controller 300. However, other implementations may also be possible. For instance, the handheld controller 300 may control the robotic system 100 directly (e.g., via communication link 402C). As such, any functionality of computing device 200 described herein may be incorporated within the handheld controller 300. Other examples and implementations may also be possible.

In a further aspect, the received input data may be in the form of computer-readable data packets, among other possible forms. Additionally, the input data may be received continuously (e.g., in real-time) or may be received from time-to-time (e.g., periodically). Further, the computing device 200 may receive input data in several separate data packets or in a single data packet. For instance, data representing rotation of the knob 312 and/or touch data may each be received via separate data packets or may all be received via the same data packet, among others. Once the input data is received, some or all of the input data may be stored in a data storage (e.g., data storage 204) and/or processed (e.g., using processors 202) to provide the functionality further discussed below.

At block 504, method 500 involves, receiving, by the handheld controller, operating mode data for the control knob (e.g., knob 312). In an example implementation, operating mode data refers to an operating mode of the motor (e.g., motor 318) of the handheld controller 300. Broadly, operating modes vary the speed and/or resistance of the control knob and can be used individually or in combination with other operating modes. For example, in various operating modes, the motor can (i) vary the turning resistance of the knob (e.g., how hard it is to twist), (ii) rotate the control knob, (iii) prevent rotation of the knob, (iv) vary the speed at which the knob can turn, (v) vary the force that is required from the user to rotate the knob, (vi) vary the resistance of the knob to simulate detents (or ticks), (vii) provide a return to center function (e.g., the motor is operable to return the knob to a certain position anytime a user releases the knob), (viii) allow for continuous spin (e.g., the motor is set to operate in a free spin mode), (ix) limit rotation (e.g., the motor is set to limit rotation to within plus or minus 45 degrees from a center point), and/or (x) increase or decrease resistance the further the knob is rotated in one direction (e.g., progressively increasing resistance as the knob is rotated may create the feeling of tension increasing as a component is wound up or a limit is reached).

Other operating modes (and combinations of operating modes) are possible. For example, the handheld controller may be configured to provide a variable resistance through customizable arc sizes of various sizes. For example, a full (or partial) rotation of the knob could be divided into a variable number of arcs, and each arc could be of various sizes. Each of the variable number of arcs could be defined to have a specific feel (e.g., one or more operating modes, such as resistance levels, speed, detents or no detents, etc.).

In an example implementation, the computing device 200 may send (e.g., via communication link 402A) a list of operating mode data for the control knob to the handheld controller. The list of operating mode data may be a preconfigured list, may be input by a user, may be loaded onto the computing device 200 (e.g., from an external memory storage device), and/or may otherwise be input into the computing device 200.

At block 506, method 500 involves operating the at least one motor to affect the rotation of the control knob in accordance with the operating mode data, based at least in part on the detected touch data. In an example implementation, the control system of the handheld controller 300 compares the detected touch data to the received operating mode data, and operates the motor 318 in accordance with the indicated operating mode for the detected touch data. For example, the control system may detect a palming, receive an operating mode list that includes a stop command for a palming touch data, and operate the motor to have a high resistance to reflect a stop command.

At block 508, method 500 involves, detecting a rotation of the control knob (e.g., knob 312). In an example implementation, the knob 312 is initially stationary and the handheld controller 300 (e.g., using the control system) compares a start location and a finish location of the knob 312 to determine the rotation of the knob 312. Alternatively, the knob 312 may initially be moving (e.g., due to an operating mode such as return to center) and the handheld controller 300 may compare an expected knob location with an actual knob location (and possibly other data, such as length of time the knob location is not at the expected knob location) to determine rotation data.

At block 510, method 500 involves generating, by the handheld controller, output data indicative of the detected touch data and the detected rotation of the knob, such that the output data is used to generate commands for control of a device. In an example implementation, to control a device, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As further discussed below, these particular operations are based on an interpretation of the input data received by the computing device 200 from the handheld controller 300.

Further, some form of feedback may be provided upon configuring the computing device 200 to operate the particular component. In one example, the computing device 200 may provide visual feedback (e.g., via display 212) indicating the particular component being controlled. In another example, the computing device 200 may send a command to the handheld controller 300 to cause vibrational feedback (e.g., provided by the motor 318) such that a user holding the handheld controller 300 can feel the vibration. In yet another example, visual feedback may be provided by the particular component of the robotic system 100. For instance, an LED that is coupled to the particular component may light up when the computing device 200 is set to operate the particular component. Other examples may also be possible.

Figure 6:
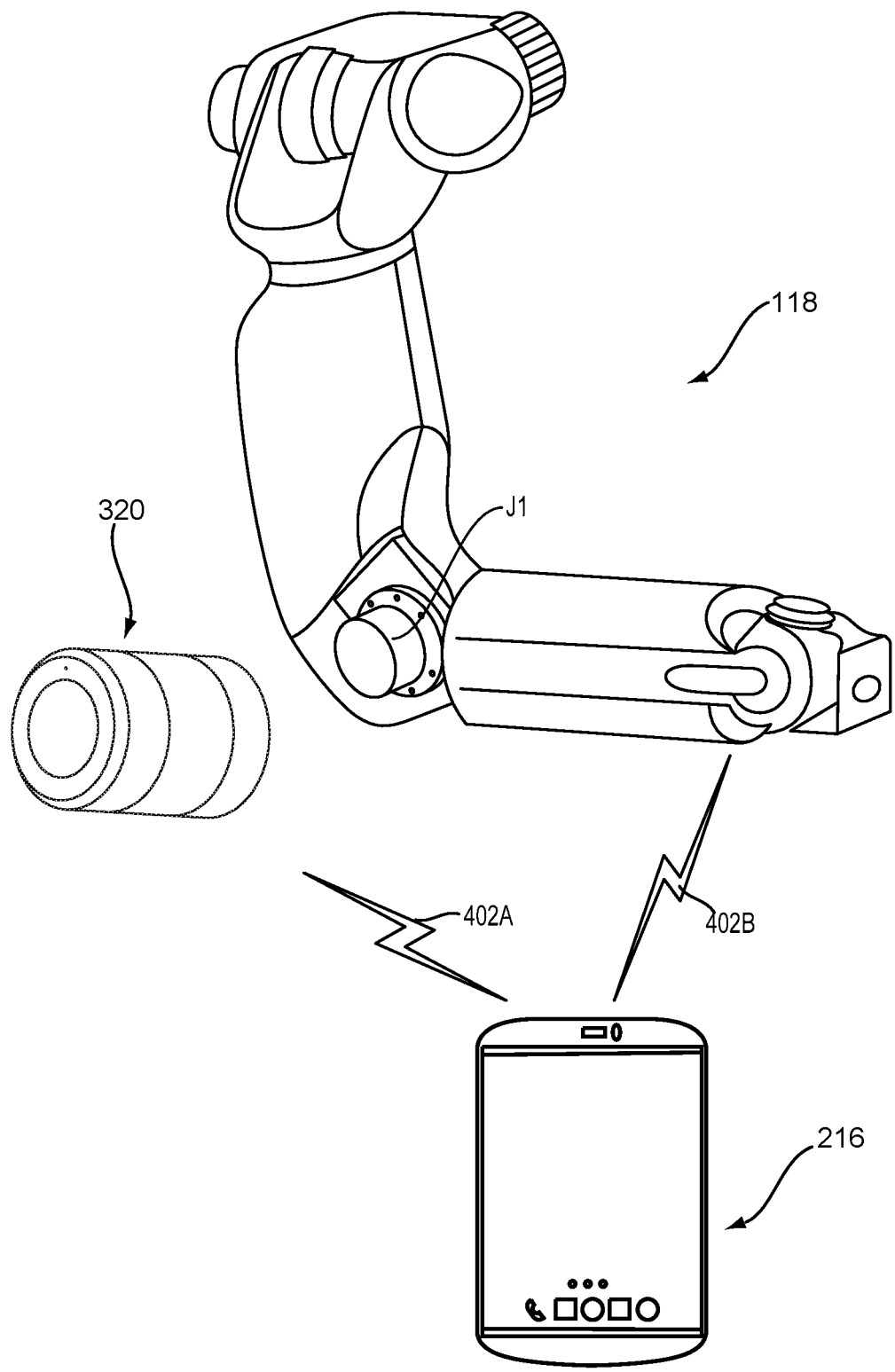
FIG. 6 illustrates example control of a first joint of a robotic arm, according to an example implementation.

In an example implementation, the input data received by the computing device 200 may be interpreted, by the computing device 200, to correspond to a particular operation of the component that is based on (i) rotation of the knob and (ii) touch data received from the touch sensors during the rotation of the knob. For instance, referring to FIG. 6, the tablet 216 may cause rotation of joint J1 based on rotation of the knob 324 of handheld controller 320 and/or based on touch data received from touch sensors on the knob 324 during the rotation.

In one example, varying the touch data may vary the operating mode of the handheld controller 300 (but may also apply to change of physical parameters related to other components). For instance, the ratio of an amount of rotation of the knob 324 to an amount of rotation of the joint J1 may be 1:1 during a "full grip". Whereas, the ratio of an amount of rotation of the knob 324 to an amount of rotation of the joint J1 may be 2:1 during a "fingertip grip".

In another example, varying the touch data may vary granularity of rotation of the knob 324 (but may also apply to granularity of physical parameters related to other components) to provide a more intuitive user experience. For instance, a "full grip" may correspond to coarse movement (e.g., relatively large degree of resistance to rotation), while a "partial grip" may correspond to medium movement, and a "fingertip grip" may correspond to a fine movement (e.g., relatively small degree of resistance to rotation). If the user is using a single fingertip, the knob would be very difficult to turn if it had the large resistance, whereas a smaller resistance provides a more intuitive user experience. Similarly, a user using a full grip may have a more limited range of rotation, and providing a larger resistance provides a more intuitive user experience.

Likewise, the operating mode of the handheld controller 300 may dynamically change based on dynamically changing touch data. For example, as the handheld controller 300 dynamically detects a change in touch data (e.g., a grip moving up or down on the controller or from a full grip to a partial grip), the output commands also dynamically change (e.g., from a coarse adjustment with a full grip to a medium adjustment with a partial grip to a fine adjustment with a fingertip grip). Other examples may also be possible.

In an example implementation, operating a particular component may involve adjusting functionality of the knob 312 (e.g., by using a custom operating mode) of the handheld controller 300 based on characteristics of the particular component (e.g., using a command sent from the computing device 200 to the handheld controller 300). In one aspect, adjusting functionality of the knob 312 may involve adjusting characteristics of rotation of the knob 312 based on characteristics of the particular component. As an example, an amount of torque needed to carry out a particular rotation of the joint J1 may correspond to an amount of torque (e.g., applied by a user) needed to rotate the knob 312 in order to cause this particular rotation of the joint J1. This relationship may be in the form of a ratio such as a 4:1 ratio of an amount torque applied by the actuator to an amount of torque applied to the knob 312. For instance, half a revolution of the joint J1 at a particular velocity may require a torque of 40 Newton-Meters. In this instance, a torque of 10 Newton-Meters should be applied to the knob 312 to result in the half a revolution of the joint J1 at the particular velocity.

In this manner, a user of the handheld controller 300 can essentially feel the "weight" of a component (e.g., a robotic joint) that is being controlled. This may provide a form of feedback to the user indicating that the handheld controller 300 is and/or the computing device 200 has been configured to operate the component. Further, if a weight is added to a component (e.g., an end effector holding an object or an external force resisting movement of an appendage etc.), the operating mode may update to reflect this added weight such as by requiring additional torque to be applied to rotate the knob 324. Note that other characteristics of rotation of the knob 312 may also change based on the characteristics of the particular component being controlled.

In another aspect, adjusting operating modes (e.g., functionality of the knob 312) may involve adjusting characteristics of touch data based on characteristics of the particular component. As an example, while operating joint J1, the ratio of amount of rotation of the knob 312 to an amount of rotation of the joint J1 may be 1:1 during a "full grip". However, if the computing device 200 reconfigures to operate a different joint (as further discussed below) such as joint J2, the ratio of amount of rotation of the knob 312 to an amount of rotation of the joint J2 may be 3:1 during the same "full grip". As such, interpretation of touch data, by the computing device 200, may change depending on the particular component being controlled. To carry out such changes, the computing device 200 may, for example, refer to stored information (e.g., in data storage 204) related to characteristics of various components as well as the specific interpretations (i.e., of received input data) that should be carried out based on characteristics of a particular component, such as for the purpose of determining operation of the particular component based on the input data.

In a further aspect, the handheld controller 300 may provide feedback (e.g., based on a command sent from the computing device 200 to the handheld controller 300) when a limit of a particular component is exceeded (or about to be exceeded). For instance, the computing device 200 may detect that rotation of a particular joint exceeds a joint limit and may responsively cause the handheld controller 300 to provide feedback such as using the knob 312 for example. Various examples of joint limits are possible.

In one example, a joint limit may be a torque limit of an actuator coupled to a particular joint. That is, the computing device 200 may detect that rotation of the knob 312, during control of the particular joint, results in a torque of the actuator reaching (or exceeding) a limit. In another example, a joint limit may be a velocity/acceleration limit of the actuator coupled to the particular joint. That is, the computing device 200 may detect that rotation of the knob 312, during control of the particular joint, results in a velocity/acceleration of the actuator reaching (or exceeding) a limit. In yet another example, a joint limit may be a power limit of the actuator coupled to the particular joint. That is, the computing device 200 may detect that rotation of the knob 312, during control of the particular joint, results in power output of the actuator reaching (or exceeding) a limit. In yet another example, a joint limit may involve restriction to rotation of the joint such as when an appendage that is coupled to the joint cannot move due to physical constraints in the environment, among other reasons. Other examples may also be possible.

Various forms of feedback can be provided to reflect such joint limits. In one example, the feedback may be vibrational feedback provided by the motor 318. The extent of the vibrational feedback may be based on an extent that a limit is exceeded and/or an extent that the limit is close to being exceeded, among others. In another example, the feedback may be in the form of resistance to rotation of the knob 312, such as a torque provided by the motor 318 to counteract rotation of the knob 312. For instance, if restriction to rotation of a joint is detected, the motor 318 may apply a counteracting torque to restrict any further rotation of the knob in the direction corresponding to the direction at which there is restriction to rotation of the joint. Other examples may also be possible.

In the case of a power-off event of a system such as the handheld controller 300, the computing device 200 or the handheld controller 300 may store information related to a most recent configuration. For instance, if the handheld controller 300 is operating in a particular operating mode, or combination of operating modes, at the time of a power-off event, the handheld controller 300 (or the computing device 200) may store information related to the fact that this particular operating mode was the most recent mode prior to the power-off event and/or may store information related to characteristics of the particular operating mode, such as position of the knob 312. Subsequently, the handheld controller 300 (or other component) can detect a power-on event. Upon such detection, the handheld controller 300 may reconfigure to operate using the most recent operating mode. For instance, the handheld controller 300 may reconfigure to operate in the most recent operating mode prior to the power-off event. Other instances may also be possible.

At block 512, method 500 involves detecting surface location data on one or more surfaces of the control knob (e.g., knob 312). In addition to detecting grips, the tactile sensor(s) may be arranged to allow for different surfaces of the handheld controller 300 to be distinguished from one another. Configured as such, the output commands of the knob (e.g., output data as described at block 510) may be varied according to the user's surface location, in addition to or in place of grip.

At block 514, method 500 involves varying the commands, based on the detected surface location data, such that commands are greater in magnitude when detected surface locations are closer to a proximate end of the handheld controller.

In an example implementation, differing inputs (e.g., height of grip on a portion of the control knob) can be distinguished and, once distinguished, output functions and/or operating modes can be separately mapped to those inputs. For example, a lower partial grip (i.e., lower grip location being closer to the proximate end 325a of the handheld controller 300) may generate an output that is different from the same partial grip but at a higher location (i.e., higher location being a location closer to the distal end 325b of handheld controller 300). In one example, a surface location data indicating a lower partial grip generates an output with a higher magnitude than surface location data indicating a higher partial grip. Similar to the description above, varying operating modes and output functions based on surface location may also provide a more intuitive user experience (e.g., a full grip may comparatively experience the largest resistance from the motor and generate the largest output data, while a single fingertip drag may comparatively experience the smallest resistance and generate the smallest output data).

VI. ADDITIONAL FEATURES

In a further aspect, the computing device 200 can receive user input (e.g., touch-input at the display 218 of the tablet 216) corresponding to selection of a feature (e.g., component) of the robotic system 100 to be operated by the handheld controller 300 (e.g., operated via interpretation of input data by the computing device 200). Responsively, the computing device 200 may cause the handheld controller 300 to operate the selected feature via operation of a particular aspect of the computing device 200. For example, when the example handheld controller 300 is configured to operate an aspect of the tablet 216 such as a GUI, touch-input may be received at the display 218 of the tablet 216. This touch-input may correspond to selection of a particular robotic arm 118 component (e.g., selection using a "drag and drop" selection icon). Selection of the particular component may be from a list of components displayed by a GUI or a model of the robotic arm 118 displayed by a GUI, among other possibilities.

In yet a further aspect, such selection via the computing device 200 may also be used for selecting between (i) control by the handheld controller 300 of the computing device 200 (e.g., particular aspects of the tablet 216) and (ii) control by the handheld controller 300 of the robotic system 100 (e.g., via the computing device 200). Additionally, such selection may also allow for varying functionality of the handheld controller 300. For instance, user input at the computing device 200 may change functionality of the motor such that rotation of the knob 312 can change between operating modes (e.g., "free spin" and providing "detents" during rotation as discussed above). Further, such selection may also allow for varying interpretation of input data received from the handheld controller 300. For instance, user input at the computing device 200 may output data, commands, or other features (e.g., user-input may change the ratios discussed above in relation to the various joints of the robotic system 100). Other instances may also be possible.

While control of the robotic system 100 was discussed above generally in the context of controlling joints of the robotic system 100, such discussion should not be seen as limiting as the example implementations discussed herein may be used for control of a variety of different robotic system 100 components, as well as components/aspects of other devices and machines. In one example, rotation of the knob 312 may allow for control of volume output of a speaker (e.g., a speaker incorporated within the robotic system 100). In another example, rotation of the knob 312 may allow for control of light output from a light source (e.g., a light source incorporated within the robotic system 100). In yet another example, rotation of the knob 312 may allow for control of movement/functionality of an end effector of the robotic system 100. Other examples may also be possible.

V. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A controller comprising:
a rotatable knob;
at least one motor that is operable to apply torque to a surface of the rotatable knob;
one or more touch sensors arranged along the surface of the rotatable knob such that the torque generated by the at least one motor is communicable to a hand gripping the rotatable knob via the surface of the rotatable knob upon which the one or more touch sensors are disposed; and
a control system configured to:
receive touch data generated by the one or more touch sensors;
based on a comparison of the touch data to predetermined grip data that specifies parameters for detection of a plurality of grips on the rotatable knob, detect when each of the plurality of grips occurs on the rotatable knob, wherein the plurality of grips comprises at least a first and second grip;
detect a first rotation of the rotatable knob;
when the first rotation is detected in association with detection of the first grip, generate first command data for a computing device; and
when the first rotation is detected in association with detection of the second grip, generate second command data for the computing device, wherein the second command data is different from the first command data.

2. The controller of claim 1, wherein at least a portion of the touch data is indicative of a touch gesture.

3. The controller of claim 2, wherein the touch gesture comprises a palming or a multi-finger sequence.

4. The controller of claim 1, wherein the touch data is indicative of a grip.

5. A controller comprising:
a rotatable knob;
at least one motor that is operable to apply torque to the rotatable knob;
one or more touch sensors comprising at least one touch sensor arranged on one or more surfaces of the rotatable knob; and
a control system configured to:
receive touch data generated by the one or more touch sensors;
receive operating data indicating one or more operating modes for the rotatable knob, wherein the one or more operating modes are associated with at least one grip;
based on a comparison of the touch data to predetermined grip data that specifies parameters for detection of a plurality of grips on the rotatable knob, detect when each of the plurality of grips occurs on the rotatable knob, wherein the plurality grips comprises at least a first and second grip;
when a first grip from the plurality of grips is detected, set a first operating mode as a current operating mode for the rotatable knob;
when a second grip from the plurality of grips is detected, set a second operating mode as the current operating mode for the rotatable knob, wherein operation in the second operating mode changes the manner in which the motor applies torque to the rotatable knob, as compared to operation in the first operating mode; and
operate the at least one motor to apply torque to the rotatable knob in accordance with the current operating mode.

6. The controller of claim 5, wherein the control system is further operable to determine surface location data corresponding to two or more surface locations on the one or more surfaces of the rotatable knob that detect a touch; and
wherein the control system is further configured to:
provide, to a controller application, surface output data indicative of the surface location data, wherein the surface output data is used to generate commands for control of a computing device.

7. The controller of claim 6, wherein the commands vary based on the surface location and the current operating mode.

8. The controller of claim 7, further comprising:
a base, wherein the rotatable knob is coupled to the base;
wherein the rotatable knob comprises a proximate end that is proximate to the base and a distal end that is distal from the base,
wherein touch input corresponding to movement from the proximate end is interpreted as a command that decreases magnitude of at least one parameter.

9. The controller of claim 5, wherein the touch data is indicative of a gesture.

10. The controller of claim 9, wherein the gesture comprises a multifinger sequence, a drag, a hold, or a swipe.

11. The controller of claim 5, wherein the plurality of predetermined grips comprise a fingertip grip and a palming.

12. The controller of claim 5, wherein the at least one motor is configured to provide one or more types of feedback selected from the following: (i) vibrational feedback, (ii) resistance to rotation of the rotatable knob, or (iii) rotational feedback by applying a torque-generating force to the rotatable knob.

13. The controller of claim 12, wherein the at least one motor is configured to provide a return to center function for the rotatable knob.

14. The controller of claim 12, wherein the at least one motor is configured to provide a limited rotation function for the rotatable knob.

15. The controller of claim 12, wherein the at least one motor is configured to provide a maximum speed of rotation for the rotatable knob.

16. The controller of claim 12, wherein the at least one motor is configured to provide a threshold amount of force required to rotate the rotatable knob.

17. A method comprising:
detecting, by a computing system, touch data generated by one or more touch sensors arranged on a rotatable knob of a controller, wherein the one or more touch sensors are arranged on the rotatable knob so as to generate touch data that provides a basis for distinguishing between two or more grips on the rotatable knob;
detecting first touch data with the one or more sensors on the rotatable knob;
based on a comparison of the first touch data to predetermined grip data that specifies parameters for detection of a plurality of grips including a first grip and a palming grip on the rotatable knob, determining that the first touch data corresponds to the first grip of the plurality of grips on the rotatable knob, and responsively, generating first command data for a computing device;

detecting second touch data with the one or more touch sensors on the rotatable knob;

based on a comparison of the second touch data to the predetermined grip data, determining that the second touch data corresponds to a second grip different from the first grip of the plurality of grips on the rotatable knob, and responsively, generating second command data for the computing device, wherein the first touch data is indicative of the first grip on the rotatable knob and the second touch data is indicative of the palming grip on the rotatable knob and the predetermined grip data is configured to distinguish between the first grip where one or more fingers touch the rotatable knob and the palming grip where a palm touches the rotatable knob, wherein the rotatable knob has a cylindrical shape configured for holding in two hands whereby a first end of the cylindrical shape is held by a left hand while a second end of the cylindrical shape, opposite the first end, is held by a right hand.

18. The method of claim 17, further comprising:

detecting surface location data on one or more surfaces of the rotatable knob, wherein the surface location data indicates location information for a touch gesture.

19. The method of claim 18, further comprising:

varying an interpretation of the touch gesture received via the rotatable knob based on the surface location data, such that a corresponding parameter is greater in magnitude when a detected surface location is closer to a proximate end of the controller.

20. The method of claim 17, wherein the first grip comprises a finger grip and the first touch data is indicative of the finger grip.

* * * * *